Figure 1:
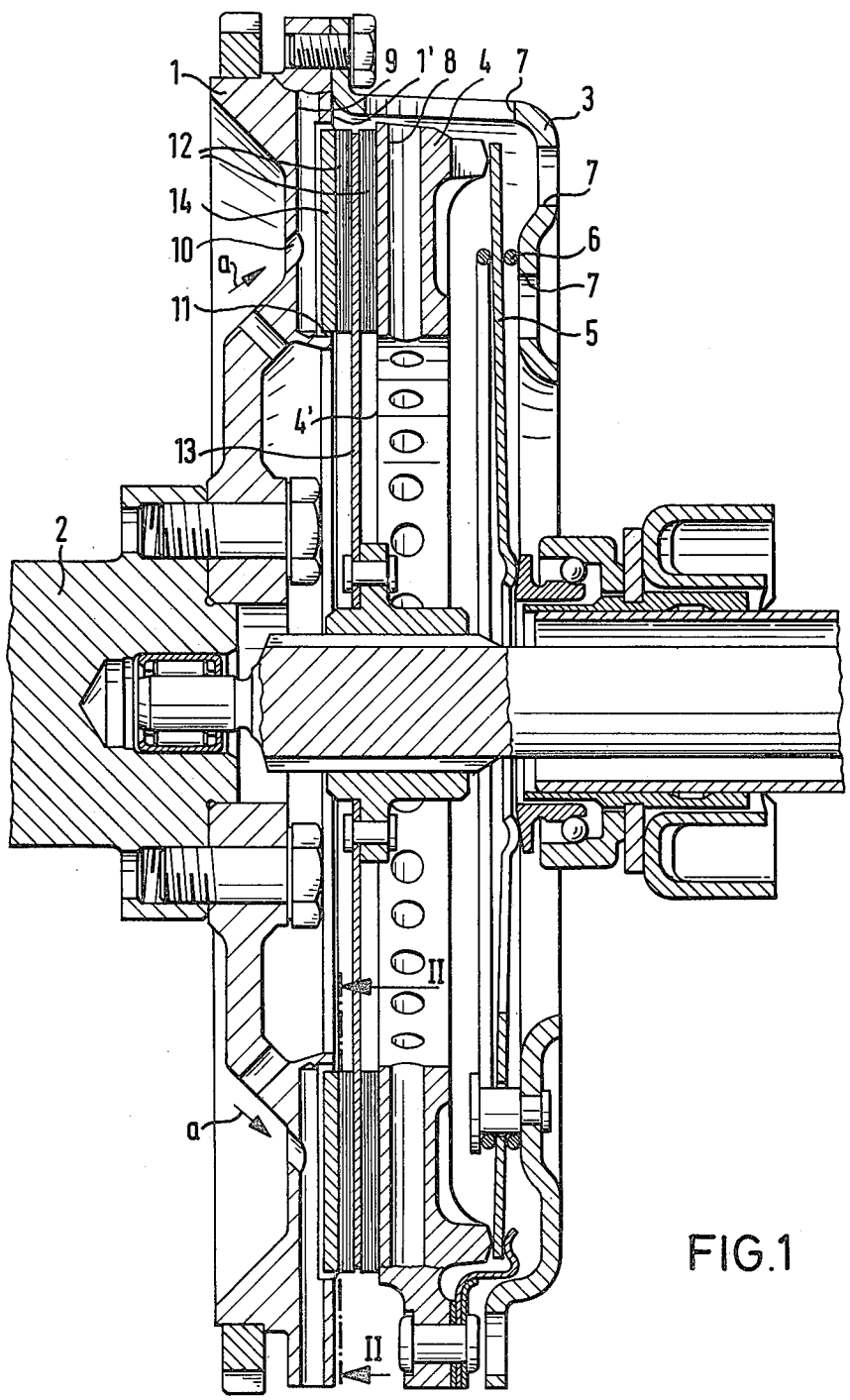

United States Patent [19]

Reh

[11] 4,294,343
[45] Oct. 13, 1981

[54] FRICTION CLUTCH FOR MOTOR VEHICLES

[75] Inventor: Walter Reh, Munich, Fed. Rep. of Germany

[73] Assignee: Bayerische Motoren Werke Aktiengesellschaft, Munich, Fed. Rep. of Germany

[21] Appl. No.: 15,152

[22] Filed: Feb. 26, 1979

[30] Foreign Application Priority Data

Feb. 24, 1978 [DE] Fed. Rep. of Germany ....... 2808019

[51] Int. Cl.³ ............................................ F16D 13/72
[52] U.S. Cl. .................................. 192/113 A; 74/572
[58] Field of Search ............ 192/113 A, 113 B, 70.12; 74/572, 573, 574

[56] References Cited

U.S. PATENT DOCUMENTS

| | | | |
|---|---|---|---|
| 2,659,468 | 11/1953 | Hobbs | 192/113 B |
| 2,976,975 | 3/1961 | Thostenson et al. | 192/70.12 |
| 3,036,680 | 5/1962 | Jaeschke | 192/113 A X |
| 3,581,855 | 6/1971 | Taeffner et al. | 192/113 A X |
| 3,583,537 | 6/1971 | Spannagel | 192/70.12 X |
| 3,707,211 | 12/1972 | Kuno | 192/113 A |
| 3,727,431 | 4/1973 | Yokel | 192/113 A X |
| 3,805,935 | 4/1974 | Armstrong | 192/113 A |
| 3,850,277 | 11/1974 | Adachi | 192/113 A X |
| 3,889,784 | 6/1975 | Hanks | 192/113 A X |

FOREIGN PATENT DOCUMENTS

| | | |
|---|---|---|
| 169388 | 8/1904 | Fed. Rep. of Germany . |
| 1750108 | 10/1974 | Fed. Rep. of Germany . |
| 32196 | 3/1905 | Switzerland ................... 192/113 A |
| 200568 | 1/1939 | Switzerland ................... 192/113 A |

Primary Examiner—C. J. Husar
Assistant Examiner—Moshe I. Cohen
Attorney, Agent, or Firm—Craig and Antonelli

[57] ABSTRACT

A friction clutch for a motor vehicle essentially consisting of a flywheel disk and of a clutch cover rigidly connected therewith which surrounds a pressure ring and a spring, whereby the spring is supported, on the one hand, at the clutch cover and, on the other, forces the pressure ring against the flywheel disk in the engaged condition of the clutch by way of a friction disk; the flywheel disk and possibly also the pressure ring are provided with uniformly distributed apertures, respectively, channels.

6 Claims, 2 Drawing Figures

FRICTION CLUTCH FOR MOTOR VEHICLES

The present invention relates to a friction clutch for a motor vehicle, especially for a passenger motor vehicle, essentially consisting of a flywheel disk and of a clutch cage or clutch cover rigidly connected with the same, which surrounds a pressure ring and at least one spring, whereby the spring, on the one hand, is supported at the clutch cover and, on the other, forces the pressure ring against the flywheel disk in the engaged condition of the clutch by way of a friction disk.

Such friction clutches are already known in the prior art, for example, from the German Auslegeschrift, No. 17 50 108. In the clutches of this type, both the flywheel disk as also the clutch cage or cover and the pressure ring have relatively large rotating masses inter alia for the absorption of the heat released during the clutching operation. The large rotating masses may cause a so-called "jerking" during the clutching operation, which becomes noticeable for the vehicle passengers in a few short longitudinal vibrations of the vehicle body. The more or less strong heat produced during the clutching operation which is absorbed by the rotating clutch parts, has as a consequence in a disadvantageous manner an increased wear at the clutch linings.

It is therefore the task of the present invention to improve a clutch of the aforementioned type in such a manner that comfort-reducing jerking vibrations are far-reachingly avoided during the clutching operation and therebeyond a good heat removal is attainable with a simultaneous weight reduction.

As solution to the underlying problems, the present invention proposes that the flywheel disk is provided with uniformly distributed apertures.

In one embodiment of the present invention, the pressure ring is also provided with uniformly distributed channels.

A considerable weight reduction is achieved in the individual parts as a result of the apertures, respectively, channels provided in the flywheel disk, in the clutch cage or in the pressure ring, from which result several advantages. On the one hand, in addition to a slight vehicle weight reduction which is to be aimed at for purposes of fuel economy, also the inertia moment of the clutch is reduced, which produces better acceleration values during the driving operation. Also the internal ventilation of the clutch is enhanced by the apertures, respectively, channels provided in the flywheel disk and/or in the pressure ring and the cooling effect is considerably improved thereby.

Accordingly, it is an object of the present invention to provide a friction clutch for motor vehicles, especially for passenger motor vehicles, which avoids by extremely simple means the aforementioned shortcomings and drawbacks encountered in the prior art.

Another object of the present invention resides in a friction clutch for motor vehicles which permits a reduction of the rotating masses to improve the driving comfort by the elimination of jerks during clutch engagements.

A further object of the present invention resides in a friction clutch for motor vehicles which enables an effective removal of heat produced during clutch engagement.

Still a further object of the present invention resides in a friction clutch for passenger motor vehicles which improves the driving comfort for the passengers while at the same time permitting a slight weight reduction of the vehicle.

Another object of the present invention resides in a friction clutch of the type described above, which permits a reduction in the inertia moment of the clutch to improve the acceleration behavior of the vehicle.

A further object of the present invention resides in a friction clutch for a motor vehicle which improves the internal ventilation of the clutch to enhance the cooling effect.

Figure 2:
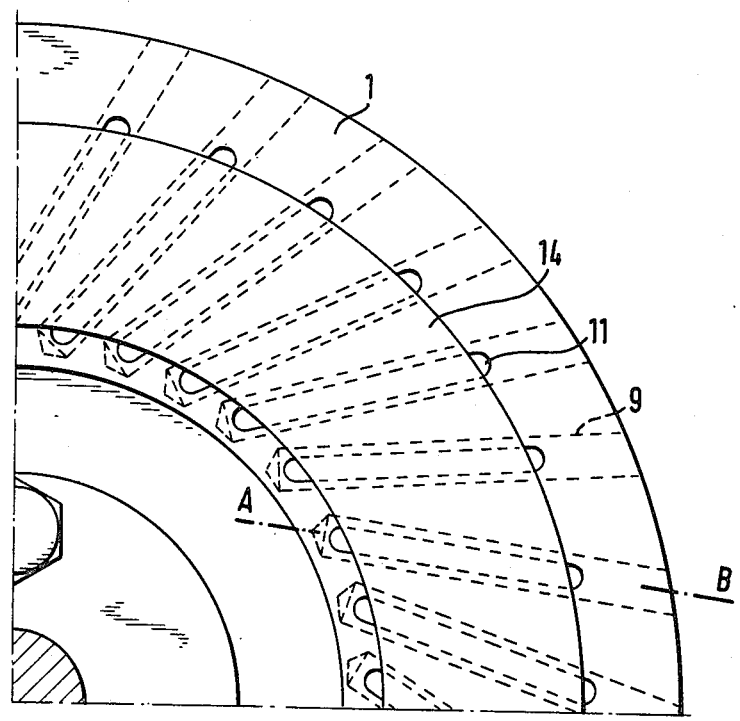

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a friction clutch in accordance with the present invention; and FIG. 2 is a partial elevational view of the friction clutch of FIG. 1, partly in cross section and taken along line II—II of FIG. 1.

Referring now to the drawing wherein like reference numerals are used throughout the two views to designate like parts, a friction clutch illustrated in FIG. 1 includes a flywheel disk 1 which is non-rotatably connected with a driving shaft 2. A clutch cage or clutch cover 3 is threadably secured to the flywheel disk 1. The clutch cage or cover 3 surrounds a thrust or pressure ring 4 and a cup spring 5 as customarily utilized at present, which cup spring abuts under prestress, on the one hand, at an end face of the pressure ring 4 and, on the other, at the inwardly disposed end face of the clutch cage or cover 3 under interposition of a ring 6.

The flywheel disk 1 includes several angularly uniformly distributed apertures 9 which are radially directed. Similarly, the pressure ring 4 may also be provided with a number of radially directed channels 8 angularly uniformly distributed. The apertures 9 and channels 8 may also extend each as secant A-B (FIG. 2) with respect to the circularly shaped hub body of the flywheel disk 1 and of the pressure ring 4. A good air through-flow and therewith an optimum cooling performance can be achieved by this measure.

The apertures 9 arranged in the flywheel disk 1 are each provided with a through-opening 10 on the engine side and with a through-opening 11 at the end face 1' acting for the most part as friction surface. The through-opening 11 is constructed as a longitudinal slot. The through-openings 10 extend each at an inclination from the engine side to the end face 1'.

With a rotating friction clutch, air is sucked-in in the direction of arrow a by way of the through-openings 10 and is introduced into the apertures 9. Since the through-openings 11 are also in communication with the apertures 9, the friction surface of the end face 1' which heats up during the clutching operation, is cooled-off.

For purposes of weight reduction, the flywheel disk 1 may consist of light-weight metal. A ring disk-shaped steel insert 14 for improving the wear resistance is arranged at the end face 1' of such a flywheel disk 1. In the engaged condition, a clutch lining 12 abuts at this insert of the end face 1' of the clutch flywheel disk 1 and at the end face 4' of the pressure ring 4. Both clutch linings 12 are mounted on an axially movable friction disk 13.

The through-openings 11 are each longer than the radial dimension of the steel insert 14 and are so arranged that the air supplied in the manner described above, is able to flow past the central opening of the steel insert 14, on the one hand, and past the outer circumference thereof, on the other. As a result thereof, the steel insert 14 is effectively cooled. By changing the inclination of the through-openings 10, air can be introduced into the apertures 9 in differently large quantities.

The degree of hardness of the end face 1' of a flywheel disk 1 consisting of light metal can also be increased by surface treatment in such a manner that it corresponds approximately to the hardness of steel.

For reasons of the weight reduction, also the clutch cage or cover 3 may be provided with apertures 7 which are radially directed uniformly distributed over its circumference and/or axially directed distributed over its end face.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A friction clutch for a motor vehicle, comprising a flywheel disk means having an end face acting predominantly as a friction surface, said end face being provided with a steel insert, a clutch cover means rigidly connected with the flywheel disk means, said clutch cover means having a plurality of openings and surrounding a pressure ring means and at least one spring, said spring being supported, on the one hand, at the clutch cover means and, on the other, forcing the pressure ring means against the steel insert of the friction surface of said flywheel disk means in the engaged condition of the clutch by way of a friction disk, said flywheel disk means being provided with a plurality of substantially uniformly distributed and outwardly extending aperture means each having a through-opening on the side of the engine and a through-opening on the side of the friction surface of said flywheel disk means, said engine side through-opening extending outwardly from the engine side toward the friction surface side and said friction surface side through-opening being in the form of a substantially longitudinal slot whereby air may be drawn in from the engine side and conducted to the friction surface side of said flywheel disk means in the manner of a radial blower, said substantially longitudinal slot partially accepting said steel insert and being so designed that the steel insert can be subjected to the flow of cooling air on all sides at least when said clutch disengaged.

2. The friction clutch according to claim 1, wherein said flywheel disk means is formed of a light metal and said steel insert is a ring-shaped steel insert, said friction surface side through-opening of each said aperture means being longer than the radial dimension of the steel insert so that air is able to flow past the central opening of the steel insert, on the one hand, and past the outer circumference thereof, on the other.

3. The friction clutch according to claim 1 or 2, wherein said pressure ring means is provided with a plurality of substantially uniformly distributed radial channel means.

4. The friction clutch according to claim 1 or 2, wherein said aperture means each extend outwardly in said flywheel to an opening in the outer circumference of said flywheel disk means.

5. The friction clutch according to claim 4, wherein said aperture means extend radially outward.

6. The friction clutch according to claim 4, wherein said aperture means and said substantially longitudinal slot through-opening on the friction surface side of the flywheel disk means extend essentially as secant to a circularly shaped hub portion of at least one of the flywheel disk means and the pressure ring means.

* * * * *